United States Patent
Girondi

(10) Patent No.: US 10,814,265 B2
(45) Date of Patent: Oct. 27, 2020

(54) AIR FILTER CARTRIDGE WITH INTERNAL STRUCTURE

(71) Applicant: UFI FILTERS S.p.A., Porto Mantovano, Mantova (IT)

(72) Inventor: Giorgio Girondi, Mantova (IT)

(73) Assignee: UFI FILTERS S.p.A., Porto Mantovano, Mantova (IT)

( * ) Notice: Subject to any disclaimer, the term of this patent is extended or adjusted under 35 U.S.C. 154(b) by 227 days.

(21) Appl. No.: 16/061,286

(22) PCT Filed: Nov. 30, 2016

(86) PCT No.: PCT/IB2016/057211
§ 371 (c)(1),
(2) Date: Jun. 11, 2018

(87) PCT Pub. No.: WO2017/098372
PCT Pub. Date: Jun. 15, 2017

(65) Prior Publication Data
US 2018/0361298 A1   Dec. 20, 2018

(30) Foreign Application Priority Data
Dec. 11, 2015   (IT) .................. 102015000082272

(51) Int. Cl.
*B01D 46/24*   (2006.01)
*B01D 46/00*   (2006.01)
(Continued)

(52) U.S. Cl.
CPC ...... *B01D 46/2411* (2013.01); *B01D 46/0049* (2013.01); *B01D 46/2407* (2013.01);
(Continued)

(58) Field of Classification Search
CPC ............ B01D 2265/06; B01D 46/2407; B01D 46/2411; B01D 46/0049; B01D 46/4281;
(Continued)

(56) References Cited

U.S. PATENT DOCUMENTS 3,750,889 A   8/1973 Acosta

FOREIGN PATENT DOCUMENTS

| EP | 0 454 346 A1 | 10/1991 |
|---|---|---|
| WO | 2007/054168 A1 | 5/2007 |

(Continued)

OTHER PUBLICATIONS

International Search Report and Written Opinion of the International Searching Authority for International Patent Application No. PCT/IB2016/057211 dated Mar. 7, 2017, 10 pages.

*Primary Examiner* — Robert Clemente
(74) *Attorney, Agent, or Firm* — Merchant & Gould P.C.

(57) ABSTRACT

An air filter cartridge (1) for an air intake system for a vehicle engine extends along a main axis (X-X). The air filter cartridge includes a filter element (5), suitable to filter the air sucked through the filter eleemtn and having extension along the main axis (X-X) and an internal structure (3) that extends inside of the filter element (5). The internal structure (3) identifies a plurality of ducts (30) fluidically independent from each other through which the filtered air flows separately. Each duct (30) extends between an inlet mouth (31), placed in proximity of a respective filter element portion (51), and an outlet mouth (32) placed in proximity of the head element (2) in such a way as to induce the intake of air through each duct (30) through the respective portion of the filter element (51).

14 Claims, 7 Drawing Sheets

(51) Int. Cl.
   *B01D 46/42* (2006.01)
   *F02M 35/02* (2006.01)
   *F02M 35/024* (2006.01)

(52) U.S. Cl.
   CPC ..... *B01D 46/4281* (2013.01); *F02M 35/0215* (2013.01); *F02M 35/02433* (2013.01); *F02M 35/02483* (2013.01); *B01D 2201/29* (2013.01); *B01D 2201/40* (2013.01)

(58) Field of Classification Search
   CPC ............ B01D 2201/29; B01D 2201/40; F02M 35/0215; F02M 35/02433; F02M 35/02483
   See application file for complete search history.

(56) References Cited

FOREIGN PATENT DOCUMENTS

| | | |
|---|---|---|
| WO | 2010/071907 A1 | 7/2010 |
| WO | 2011/023503 A1 | 3/2011 |

AIR FILTER CARTRIDGE WITH INTERNAL STRUCTURE

This application is a National Stage Application of PCT/IB2016/057211, filed 30 Nov. 2016, which claims benefit of Serial No. 102015000082272, filed 11 Dec. 2015, and which applications are incorporated herein by reference. To the extent appropriate, a claim of priority is made to each of the above-disclosed applications.

FIELD OF APPLICATION

This invention relates to an air filter cartridge for an air intake system of an engine for a vehicle. This invention also relates to an air filter group comprising said air filter cartridge. In addition, this invention also relates to an intake system comprising said air filter cartridge and to an intake system comprising said filter group.

STATE OF THE ART

In the state of the art, air filter systems are known through which air is sucked and then conveyed to the internal combustion chamber of the related endothermic engine.

Such systems are typically placed upstream of the intake system and are suitable to filter the air sucked in such a way as to prevent the access of unwanted material, such as dirt or dust, inside the combustion chamber.

To improve the operation and performance of the endothermic engine, it is of fundamental importance that these filter systems allow the entry of the largest possible quantity of air, while effectively filtering it.

To achieve this objective, it is therefore essential that the filter system comprise as much filtering surface as possible and that this surface achieve an effective filtration.

By contrast, in the known solutions it emerges that increasing the size of the filtering surface also increases difficulties in obtaining efficient operating condition of the filter.

Specifically, this problem is particularly felt in solutions with filtering surfaces of considerable size, for example having a filtering surface of tubular extension, in which only some portions of the filter element effectively suction and filter the air, presenting different filtration speeds at different portions of the filter element.

In fact, the flow of air sucked by the filter tends to concentrate in areas of the filtering surface adjacent to, or in proximity of, the head, or intake, portion of air by the filter, in fact underutilising large portions of the filtering surface; or again, the flow of air sucked by the filter is not homogeneous in its speed crossing the filter element, presenting some portions through which the suction speed is too high and other portions in which is too low to achieve an effective filtering action.

Typically, this non-uniformity of operation is a cause of accelerated wear of those portions that are working more and not optimally and, in some extreme cases, even of their premature clogging by dirt present in the air to be filtered; therefore, even if not all the portions of the filtering surface are worn or clogged, it becomes necessary replace the filter element.

For example, a filter solution with this problem is shown in document WO2011/023503 in the name of the Applicant. Another example of said filter solutions with this problem is shown in document EP0454346.

To overcome this problem, in the state of the art, filtration system solutions have been developed having a filtering surface folded on itself or pleated to increase the filtering surface and thus ensure a more even speed distribution of the air sucked through the filtering surface.

However, such solutions have a complex and bulky geometry and, moreover, require specific air distribution elements positioned upstream of the filter element suitable to direct the air being sucked towards specific portions of the pleated surface, as well as special support and reinforcing structures of the pleated surface itself. By way of example, a filter solution with a pleated surface is shown in document WO2007/054168 in the name of the Applicant. Other known examples of filter solutions with this problem are shown in documents WO2010/071907 and US375088.

SOLUTION OF THE INVENTION

There is therefore a strongly felt need to have an air filter cartridge suitable to maximise the flow rate of air to the engine by performing an effective filtering action while, at the same time, exploiting the widest, preferably the whole, filtering surface of the filter element, minimising as much as possible its overall dimensions inside the motor vehicle, for example in the engine compartment.

The purpose of this invention is, therefore, to provide an air filter cartridge having a filter element suitable to effectively perform the action of filtered intake of air, overcoming the drawbacks of the known art mentioned above.

DESCRIPTION OF THE DRAWINGS

Further characteristics and advantages of the invention will appear in the following description of its preferred embodiments, provided by way of non-limiting example, with reference to the accompanying figures, in which.

DETAILED DESCRIPTION

Figure 1:
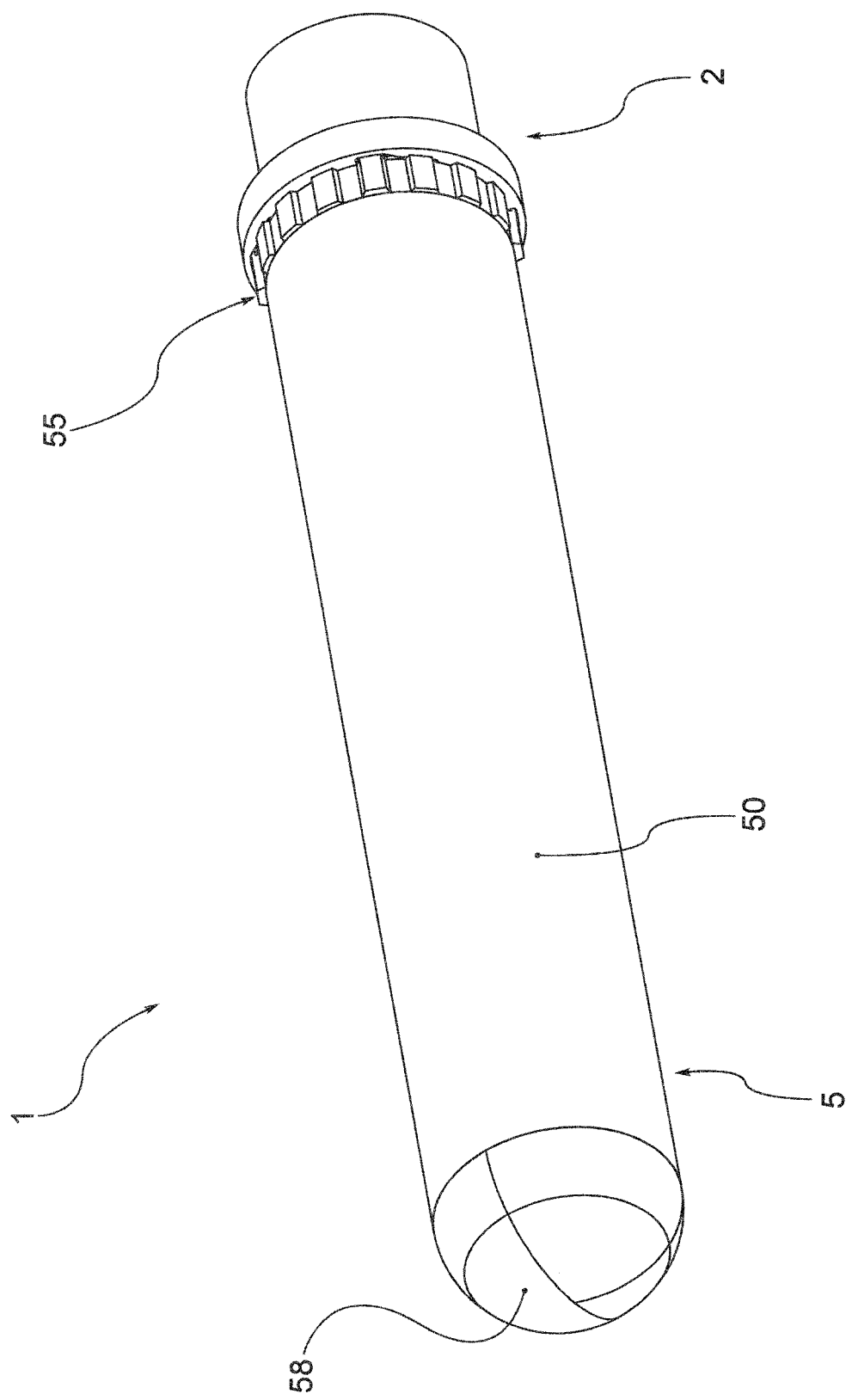
FIG. 1 shows a perspective view of the air filter cartridge according to a preferred embodiment.
Figure 2:
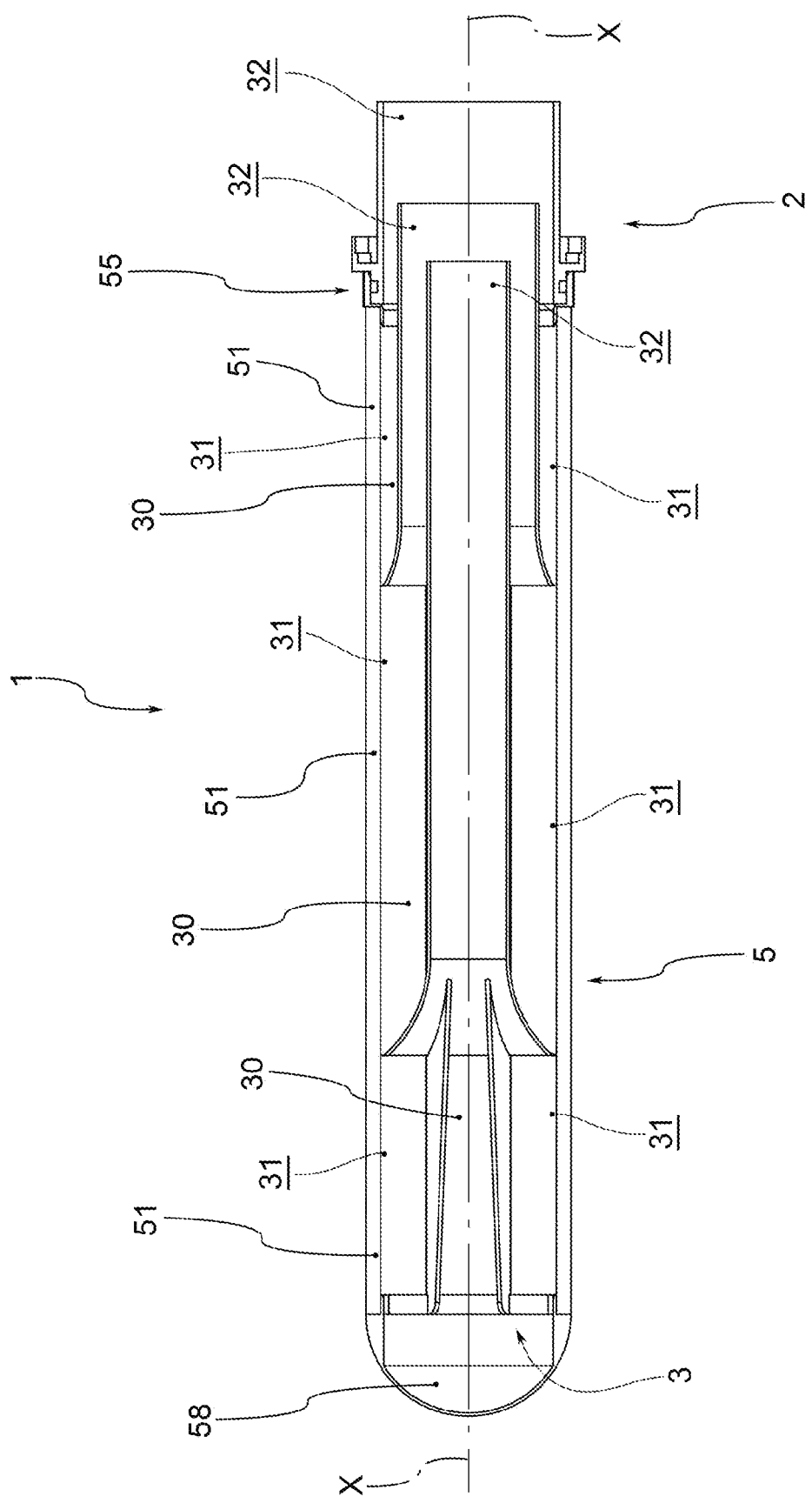
FIG. 2 illustrates a perspective view, in longitudinal section, of the air filter cartridge of FIG. 1.
Figure 3:
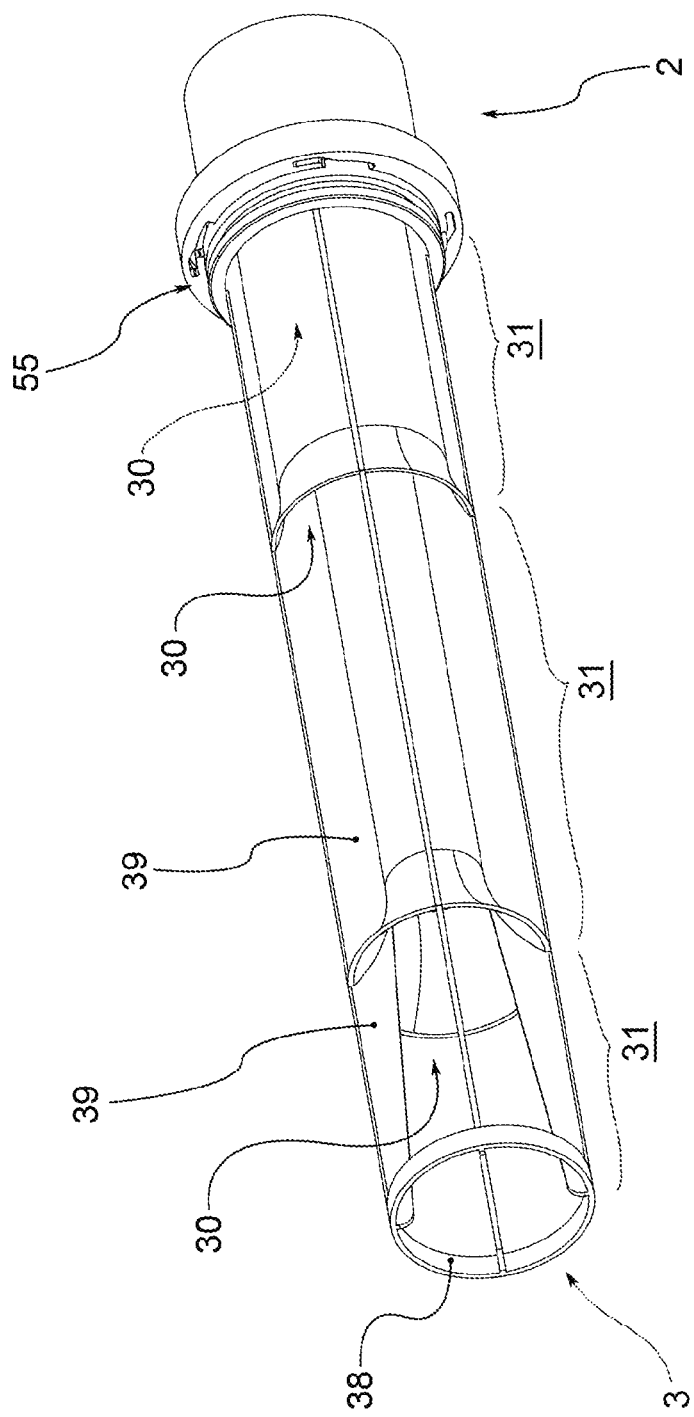
FIG. 3 is a perspective view of the internal structure comprised in the air filter cartridge shown in FIGS. 1 and 2.
Figure 4:
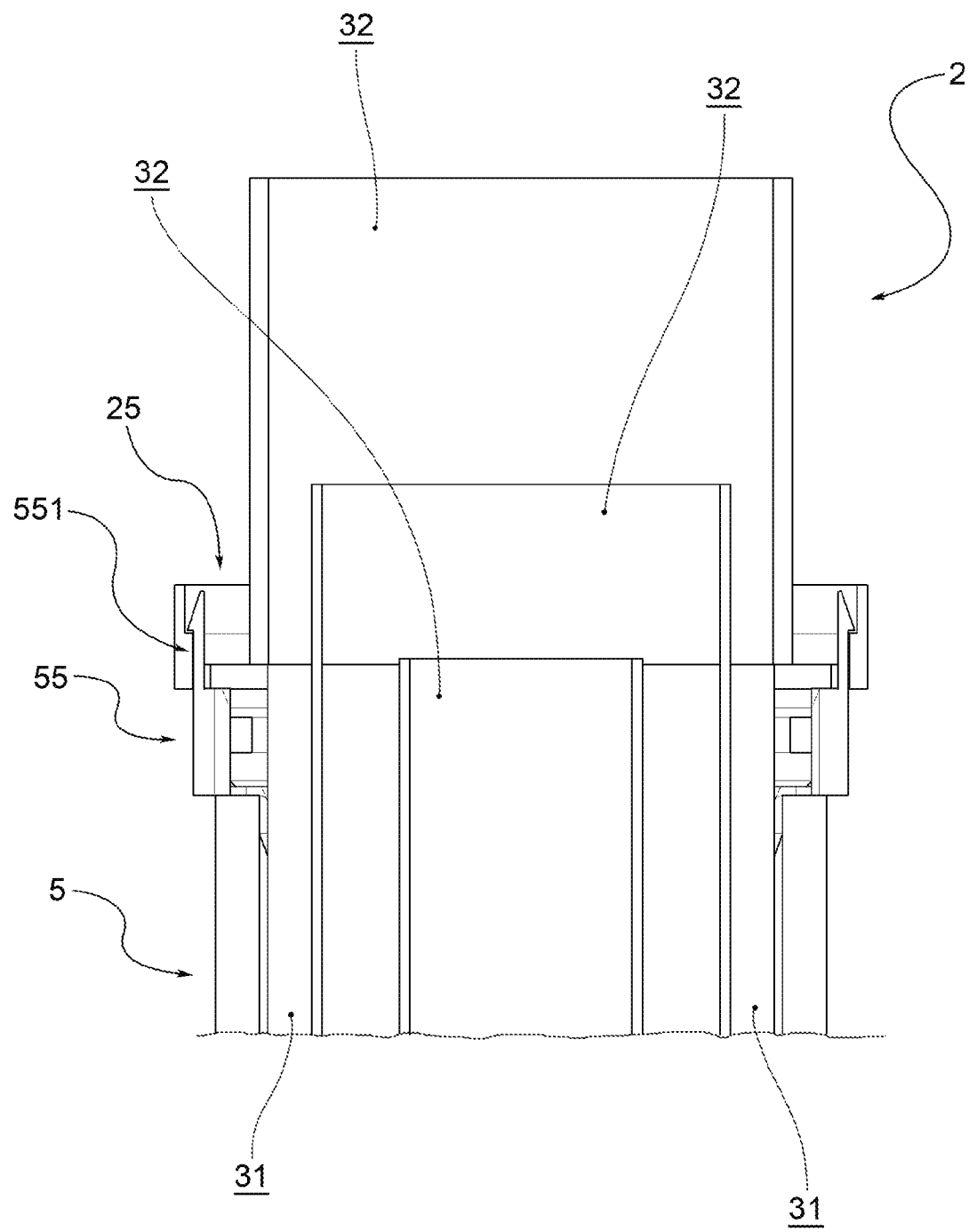
FIG. 4 shows an enlarged view of a detail of the filter cartridge, in its head end.
Figure 5:
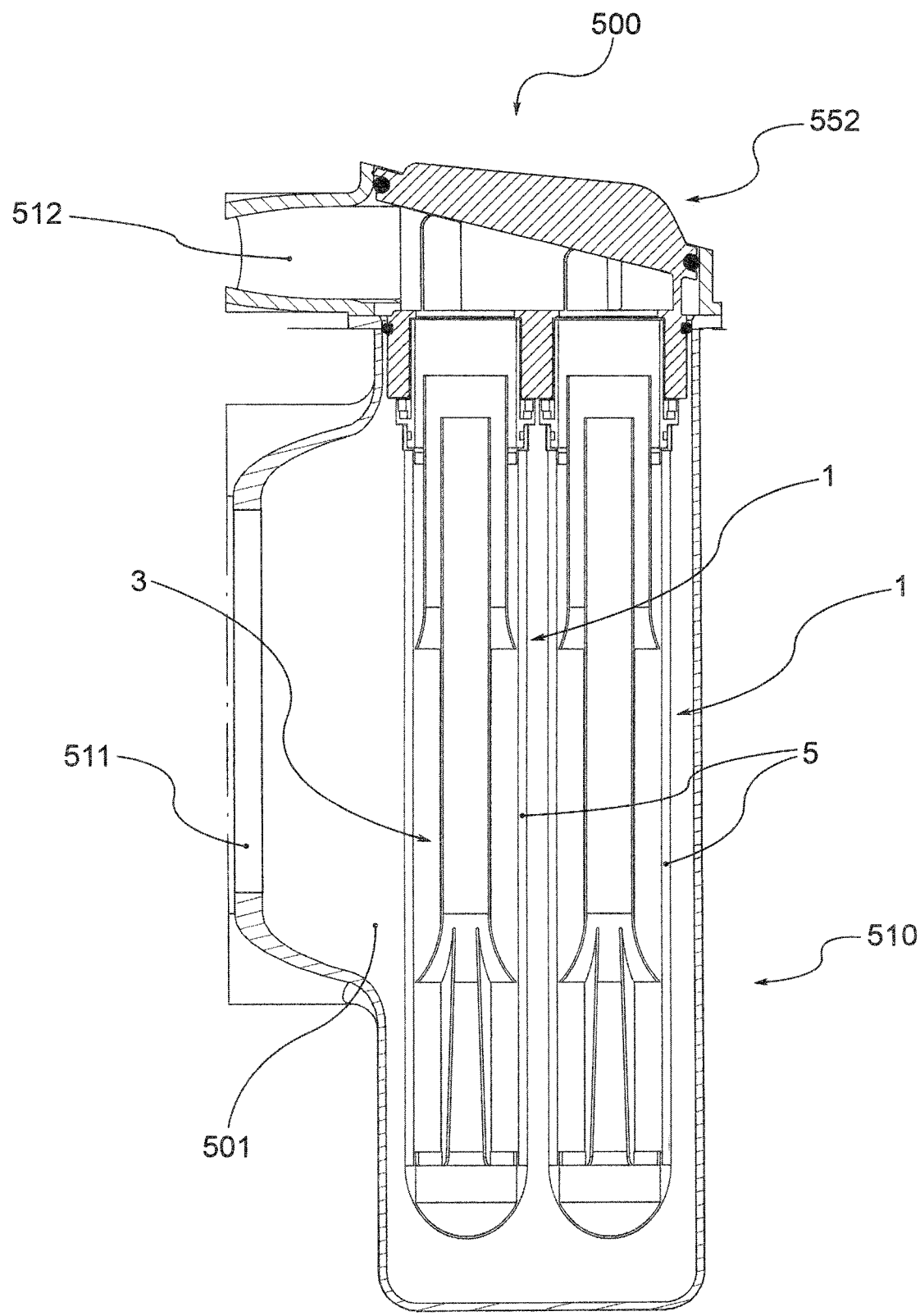
FIG. 5 illustrates a sectional view of a filter group comprising an air filter cartridge, according to a preferred embodiment.

With reference to the accompanying figures, number 1 indicates an air filter cartridge for an air intake system of an engine for a vehicle.

The air filter cartridge 1 finds application in the automotive sector, being positionable upstream of an engine, in particular upstream of the engine intake manifold, to allow the filtered intake of a predefined quantity of air up to the combustion chamber of the engine. Thus, the air filter cartridge 1 is suitable to allow the filtered intake of a predefined air flow rate necessary for the correct operation of the engine.

According to a preferred embodiment, the air filter cartridge 1 has a body that extends longitudinally along a main axis X-X. In other words, the air filter cartridge 1 preferably has a predominant dimension with respect to the others.

In addition, according to a preferred embodiment, the air filter cartridge 1 comprises a head element 2 located at one end of the filter cartridge suitable to permit the fluidic connection of the cartridge with the air intake system; if necessary, as illustrated below, the head element 2 is suitable to allow the fluidic connection of the cartridge 1 with the intake system allowing its mounting on a respective filter group 500, part of the intake system.

Preferably, the air filter cartridge 1 is fixed cantilevered from said head element 2.

According to a preferred embodiment, the air filter cartridge 1 also comprises a filter element 5 suitable to filter the air sucked through it.

In fact, preferably, the filter element 5 is suitable to be invested by the air; in other words, following the air path, upstream of the filter element 5, ambient air is identified, while downstream of the filter element 5, filtered air is identified since, in the passage of the air through the filter element 5, the unwanted particles suspended in the ambient air are blocked by the filter element 5.

According to a preferred embodiment, the filter element 5 has extension along the main axis X-X starting from the head element 2.

In particular, the filter element 5 comprises a filter wall 50 permeable to air, but suitable to retain the unwanted particles, and a coupling structure 55 to which is connected said filter wall 5.

According to a preferred embodiment, the air filter cartridge 1 has a substantially tubular shape, preferably cylindrical, prismatic, conical, or frusto-conical. Preferably, the filter element 5 has a substantially tubular shape, preferably cylindrical, prismatic, conical, or frusto-conical. Preferably, the filter wall 50 has a substantially tubular shape, preferably cylindrical, prismatic, conical, or frusto-conical.

According to a preferred embodiment, the filter wall 50 is made in one piece.

Preferably, the filter wall is made of a fibrous material, for example polymeric fibres, for example, is made of a non-woven material.

According to a preferred embodiment, the filter element 5 comprises a tip 58 at the opposite end to the head element 2. Preferably, this tip 58 is made of a different material from that of the filter wall 50, for example, is not permeable to air. Preferably, said tip has a substantially distally tapered shape, for example has a hemispherical shape, in such a way as to facilitate the flow of ambient air towards the filter wall 50.

Preferably, the filter element 5 is operatively connected to, as well as supported by, the head element 2. Preferably, the filter element 5 and the head element are mutually engaged by means of specific components suitable to realise their mutual locking.

In fact, preferably, the head element 2 comprises coupling openings 25 and the filter element 5 comprises coupling teeth 551, comprised in the coupling structure 55, suitable to engage with said coupling openings 25. Preferably, the teeth 551 and openings 25 are snap-engaged. Preferably, instead, their disengagement is obtained by rotation, in particular in the tubular embodiment of the air filter cartridge 1.

According to a preferred embodiment in accordance with this invention, the air filter cartridge 1 has an internal structure 3 that extends in length starting from said head element 2 to inside the filter element 5.

Preferably, said internal structure 3, in accordance with what is described below, is suitable to make the air intake speed through the filter element 5 more homogeneous. In other words, by means of the internal structure 3, the ambient air is sucked through the filter element 5 in a more uniform manner along the entire length of the filter wall 50.

Preferably, moreover, the internal structure 3, in some embodiments, it is also suitable to provide internal support to the filter element 5.

According to a preferred embodiment, the internal structure 3 identifies a plurality of ducts 30 independent of each other through which the filtered air flows separately.

Preferably, each duct 30 extends between an inlet mouth 31, placed in proximity of a respective portion of filter element 51, comprised by the filter wall 50, and an outlet mouth 32 placed in proximity of the head element 2 in such a way such as to induce the intake of air through each duct 30 through said respective portion of filter element 51.

Through said ducts, the ambient air crosses the filter wall 50, in particular identifying specific portions of filter element 51, in such a way that the filtered air is at a constant speed along the length of the filter wall 50. In other words, the air speed through each filter element 51 is substantially the same.

Preferably, the inlet mouths 31, respectively of each duct 30, are positioned side by side axially along the main axis X-X. In other words, in height, along the main axis X-X are identified a plurality of portions of filter element 51.

Preferably, the union of the various portions of filter element 51 comprises the filter wall 50 in its entirety.

According to a preferred embodiment, the shape and trajectory of each duct 30 is designed to facilitate the motion of the filtered air inside the internal structure 3 and thus inside of the air filter cartridge 1. In fact, preferably, each duct 30 comprises a linear section 300 that extends parallel to the extension axis X-X. Preferably, the linear section 300 is in proximity of the head element 2.

Moreover, according to a preferred embodiment, the ducts 30 in the portion of the duct next to the inlet mouth 31 have a section transverse to the main axis X-X, which tapers away from the filter wall 51. In other words, the filtered air sucked through the respective duct 30 is also suitable to accelerate its speed by exploiting the Venturi effect. In fact, the section of passage through the inlet mouth 31 is greater than that of the outlet mouth 32.

According to a preferred embodiment, the ducts 30 in proximity of the respective inlet mouth 31 comprise a curved section 310, suitable to favour the motion of the filtered air. In other words, each duct 30 has at least one of the walls that delimit it that extends to a curved section in proximity of the inlet mouth 31.

According to a tubular embodiment of the air filter cartridge 1, the internal structure 3 has a substantially axisymmetric shape; preferably, each inlet mouth 31 extends concentrically with respect to the main axis X-X and each duct 30 comprises a portion of linear section concentric to the adjacent duct 30 forming, for at least one of said ducts 30, an annular tubular section. For example, if along the main axis X-X are identified three inlet mouths 31, in proximity of the head element 2 are identified three outlet mouths 32, concentric to one another, in which the central mouth has a circular section, while the other sections have an annular section.

In a preferred embodiment, the duct 30 having the inlet mouth 31 most distal from the head element 2 has the central outlet mouth 32. So, rising along the main axis X-X, the inlet mouths 31 are increasingly proximal to the element head 2 while the outlet mouths 32 will always be more distal, radially, from the main axis X-X.

According to a preferred embodiment, each duct 30 extends along the main axis X-X for a predefined length, in such a way that the outlet mouth 32 of one duct 30 is axially offset with respect to the axial position of the outlet mouth 32 of another duct 30. In other words, each duct 30 extends longitudinally along the main axis X-X for a predefined length different from that of the other ducts 30.

Preferably, in the embodiment with axisymmetric internal structure 3, the outlet mouth 32 of the central duct 30 is in a lower axial position with respect to the outlet mouth 32 of the duct radially adjacent to it. In other words, starting from the main axis X-X, the duct 30 radially outermost extends longitudinally more than the inner one.

Preferably, these techniques are also such as to facilitate the flow of filtered air 3, in particular in its exit from the air filter cartridge 1 towards the intake system.

According to a preferred embodiment, the head element 2 and the internal structure 3 are engaged with each other in such a way that the head element 2 also supports internal structure 3 and the filter element 5 is suitable to be fitted on the internal structure 3 and fixed, as described, to the head element 2.

Preferably, the internal structure 3 is suitable to support the filter element 5 along the main axis X-X, by means of the inlet mouths 31, which are suitable to lay internally on the filter wall 50 supporting it radially. According to this preferred embodiment, the edges delimiting the inlet mouths 31 are suitable to engage, preferably sealingly, the filter wall 50 delimiting the portions of the filter element 51 through which the air is sucked.

Furthermore, according to a preferred embodiment, the internal structure 3 comprises a tip element 38 suitable to internally support the tip 58 of the filter element 50 to support it solidly.

Preferably, the internal structure 3 comprises reinforcing ribs 39 engaging each of the various ducts 30 to reinforce them. Preferably, also the reinforcing ribs 39 are suitable to provide support to the filter element 5.

Preferably, in the tubular embodiment of the air filter cartridge 1, said ribs extend in length along the main axis X-X and are angularly equidistant from each other.

According to a preferred embodiment, the internal structure 3 is made of a polymeric material, preferably is made of nylon and/or nylon loaded with glass fibre.

In addition, according to a preferred embodiment, the head element 2 and the filter structure 3 are constituted in a single integral piece. Preferably, the single integral piece made of a polymeric material, preferably is made of nylon and/or nylon loaded with glass fibre.

This invention also relates to a filter group 500 for an air intake system of an engine.

Preferably, the filter group 500 comprises a filter housing 510 identifying a filter chamber 501 and having an inlet opening 511 through which air enters from the environment and an outlet opening 512 through which the air flows separately into the intake system towards the engine.

Preferably, housed internally to said filter chamber 501, the filter group 500 comprises at least one air filter cartridge 1, having the characteristics described above; preferably through the inlet opening 511, ambient air accesses the filter chamber 501; the ambient air is then sucked through the air filter cartridge 1, and then the filtered air exits the filter group 500 through the respective outlet opening 512.

Preferably, each filter group 1 comprises at least two air filter cartridges 1.

Preferably, the filter group 1 comprises a top element 552 engageable by the head element 2 of the air filter cartridge 1 and sealingly fixable to the filtration chamber 501, wherein said top element 552 is removable, in such a way as to allow its removal and the simultaneous extraction of the air filter cartridge 1.

This invention also relates to an air intake system of a vehicle engine comprising an air filter cartridge 1. Preferably, the air filter cartridge 1 is in this case freely lapped by ambient air.

In addition, this invention also relates to an air intake system of a vehicle engine comprising a filter group 500 according to what has been described. Preferably, the air filter cartridge 1 is then housed in the specific housing 501 of the filter group 500 and the ambient air reaches the filter cartridge 501 conveyed in the filter chamber 501.

Figure 6:
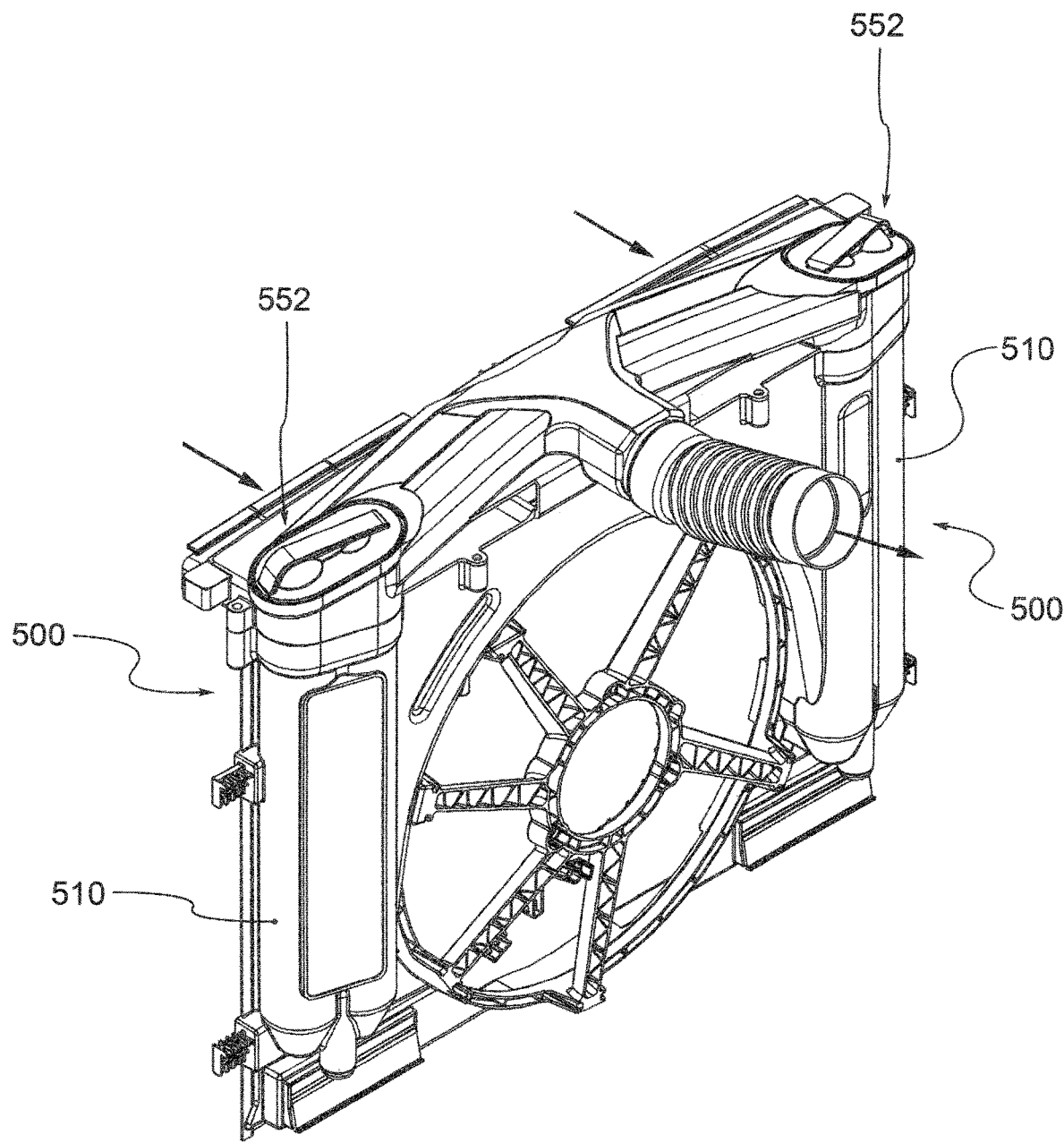
FIG. 6 shows an intake system comprising the filter group of FIG. 5.
Figure 7:
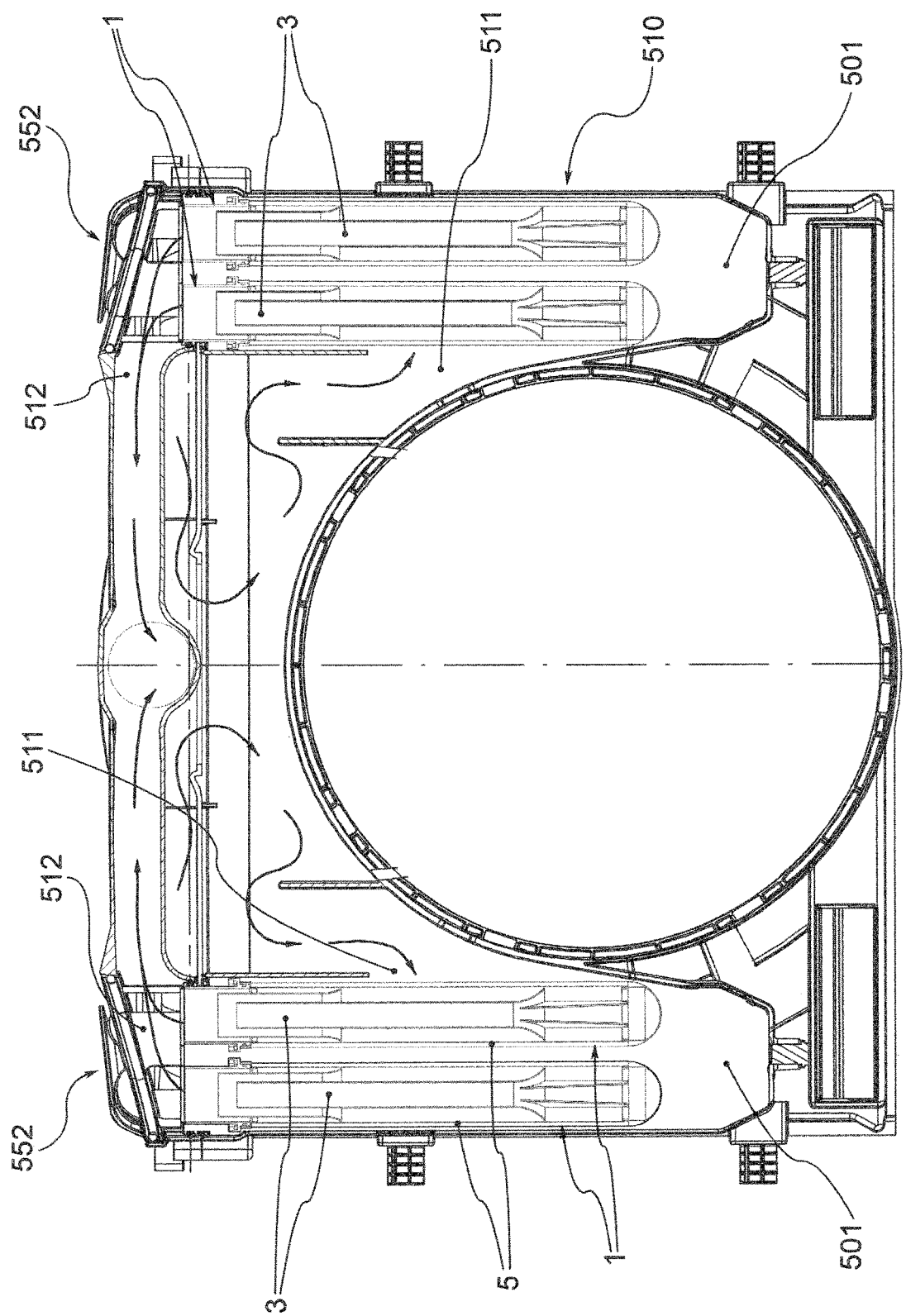
FIG. 7 shows a section of the intake system of FIG. 6.

Several non-limiting examples of a part of the air filtration system comprising the filter group 500 are shown in accompanying FIGS. 6 and 7; in said figures, one can infer any dispositions or possible sizes of a filter group 500 and an air filter cartridge 1 according to a preferred embodiment.

Further, this invention relates to an insert for filter cartridge insertable in filter elements having a filter wall. The insert indicatively comprises a head element 2 and an internal structure 3 that extends in length starting from said head element 2 insertable inside the filter element 5. Preferably, the internal structure 3 of the insert identifies a plurality of ducts 30 fluidically independent from each other through which the filtered air flows separately, wherein each duct 30 extends between an inlet mouth 31, placed in proximity of a respective filter element portion, and an outlet mouth 32 placed in proximity of the head element 2 in such a way as to induce the intake of air through each duct 30 through said respective portion of the filter element 51. Preferably, for tubular filter elements that preferably extend in a substantially axisymmetric way along the main axis X-X, also the insert has a substantially axisymmetric shape and in turn extends along the main axis X-X.

This invention also relates to the intake method of sucking filtered air of a vehicle engine air intake system through an air filter cartridge having the characteristics described above.

In fact, preferably, this method comprises the step of filtering air through the respective filter element portion through the respective duct 30.

Innovatively, the air filter cartridge, the filter group that contains it, the air intake systems comprising the air filter cartridge and/or the filter group amply fulfil the purpose of this invention, overcoming the typical problems of the known art.

Advantageously, in fact, the air filter cartridge has a filter wall, preferably of considerable size, which performs the functions of suction and filtration in an optimal manner. In fact, advantageously, in its entirety, the filter cartridge is suitable to provide ideal filtration speed to ensure a correct operation of each of its portions. In other words, advantageously, the filter cartridge is suitable to allow a homogeneous and optimal suction/filtration of air through the entire filter wall, ensuring the desired flow of air. Therefore, advantageously, the air filter cartridge of this invention does not have portions that show accelerated wear with respect to the others.

Moreover, advantageously, the air filter cartridge has large dimensions of its filter wall and does not require the use of specific pleated walls to achieve the area of such filtering surfaces, thus solving the specific problems of such solutions.

Advantageously, the pressure drop of the air filter cartridge is constant as well as absolutely very low. In particular, advantageously, the internal structure and independent ducts delimited by it allow the suction of filtered air in such a way as to minimise head losses. Advantageously, also the structure and the trajectory delimited by the ducts is suitable to favour the motion of filtered air.

Moreover, advantageously, upstream of the air filter cartridge there is no requirement for a diffusion structure of the air towards the filter wall, placed upstream of the filter cartridge itself.

A further advantageous aspect resides in the maximisation of the operating conditions of the air filter cartridge and its overall dimensions. This solution has extraordinary advantages in its application in the automotive sector.

Advantageously, the internal structure of the filter cartridge allows supporting the filter wall also allowing the use of flexible filter elements with reduced wall thickness. Advantageously, in fact, the filter element does not need a further separate support element.

Moreover, advantageously the filter element is insertable (and lockable) or removable (and unlockable) on the internal structure by means of simple and intuitive operations.

Advantageously, the internal structure is obtained by moulding thus being particularly economical in its production.

In addition, advantageously, the air filter cartridge is suitable to solve the problem related to the noise pollution of the engine. In fact, the filter cartridge, by means of its internal structure, is suitable to avoid the return of engine noise to the environment, through the intake system.

Advantageously, the arrangement of the ducts of the internal structure is suitable to stop the sound waves emitted by the engine through the air intake system.

Advantageously, as exemplified in the accompanying figures, the filter cartridge and filter group are suitable to easily find space in the engine compartment by being integrated into other components such as the radiator of the vehicle.

Moreover, advantageously, all the above-mentioned advantages are even higher in the embodiment with tubular air filter cartridge and substantially axisymmetric internal structure.

Innovatively, the above-mentioned advantages can be found and obtained through an insert, in turn covered by this invention, suitable to be inserted in specific filter elements.

In addition, innovatively the above-mentioned advantages can be found and obtained through the method of suctioning filtered air described above.

It is clear that one skilled in the art, in order to meet specific needs, may make changes to the filter cartridge and filter group described above, all contained within the scope of protection defined by the following claims.

LIST OF REFERENCE NUMBERS 1 air filter cartridge
X main axis
2 head element
25 coupling openings
3 internal structure
30 duct
31 inlet mouth
32 outlet mouth
300 linear section
310 curvilinear section
38 tip element
5 filter element
50 filter wall
51 portion of filter element
55 coupling structure
551 coupling teeth
58 tip
500 filter group
501 filtration chamber
510 filtration casing
511 inlet opening
512 outlet opening
552 of top element

The invention claimed is:

1. Air filter cartridge of an air intake system of an engine for a vehicle wherein in said air intake system, air is sucked through said filter cartridge so filtered air arrives at an engine of the vehicle, wherein the air filter cartridge has a body extending longitudinally along a main axis having a substantially tubular shape, said cartridge comprising:
a head element located at one end of the filter cartridge fluidic connecting the cartridge with the air intake system;
a filter element, comprising a filter wall, filtering the air sucked through the filter element and having extension along the main axis starting from the head element;
an internal structure extending in length from said head element to inside of the filter element, identifying a plurality of ducts fluidically independent from each other through which the filtered air flows separately;
wherein each duct extends between an inlet mouth proximate the filter wall and an outlet mouth placed proximate the head element;
wherein the internal structure induces intake of air through each duct through the filter wall identifying for each duct a respective portion of the filter element faced to the inlet mouth to suck the air through the respective filter element portion through the respective duct;
wherein the internal structure has a substantially axisymmetric shape with respect to the main axis;
wherein the inlet mouths, respectively of each duct, are positioned side by side axially along the main axis, each inlet mouth extends concentrically with respect to the main axis;
each duct comprises a linear section extending parallel to an axis of the extension concentric to an adjacent duct forming an annular tubular section for at least one of said ducts; and
wherein the head element comprises coupling openings and the filter element comprises a coupling structure with coupling teeth engaging with said coupling openings.

2. Air filter cartridge according to claim 1, wherein the filter element comprises a filter wall, comprising said filter element portions, formed in one piece.

3. Air filter cartridge according to claim 2, wherein the filter wall is made of a fibrous material selected from the group consisting of: polymeric fibres or a non-woven material.

4. Air filter cartridge according to claim 1, wherein the ducts in the portion of the duct next to the inlet mouth have a section transverse to the main axis, which tapers away from the filter wall.

5. Air filter cartridge according to claim 1, wherein the ducts in a vicinity of the respective inlet mouth have at least one wall delimiting the ducts that extends for a curved section.

6. Air filter cartridge according to claim 1, wherein the head element and the internal structure are engaged with each other so the head element supports internal structure, wherein the filter element fits on the internal structure and is fixed to the head element.

7. Air filter cartridge according to claim 1, wherein the internal structure is suitable to support the filter element along the main axis, wherein the inlet mouths lay internally on the filter wall.

8. Air filter cartridge according to claim 1, wherein the head element and the filter cartridge are made in a single integral piece of a polymeric material.

9. Air filter cartridge according to claim 1, wherein engagement between teeth and openings comprises a snap coupling while disengagement is obtained by rotation.

10. Air intake system of the engine of a vehicle comprising an air filter cartridge according to claim 1.

11. Air filter cartridge of an air intake system of an engine for a vehicle wherein in said air intake system, air is sucked through said filter cartridge so filtered air arrives at an engine of the vehicle, wherein the air filter cartridge has a body extending longitudinally along a main axis having a substantially tubular shape, said cartridge comprising:
   a head element located at one end of the filter cartridge fluidic connecting the cartridge with the air intake system;
   a filter element, comprising a filter wall, filtering the air sucked through the filter element and having extension along the main axis starting from the head element;
   an internal structure extending in length from said head element to inside of the filter element, identifying a plurality of ducts fluidically independent from each other through which the filtered air flows separately;
   wherein each duct extends between an inlet mouth proximate the filter wall and an outlet mouth placed proximate the head element;
   wherein the internal structure induces intake of air through each duct through the filter wall identifying for each duct a respective portion of the filter element faced to the inlet mouth to suck the air through the respective filter element portion through the respective duct;
   wherein the internal structure has a substantially axisymmetric shape with respect to the main axis;
   wherein the inlet mouths, respectively of each duct, are positioned side by side axially along the main axis, each inlet mouth extends concentrically with respect to the main axis;
   each duct comprises a linear section extending parallel to an axis of the extension concentric to an adjacent duct forming an annular tubular section for at least one of said ducts; and
   wherein each duct extends along the main axis for a predefined length, wherein the outlet mouth of a duct is axially offset with respect to an axial position of the outlet mouth of another duct.

12. Air filter cartridge according to claim 11, wherein the outlet mouth of a radially more central duct is located at a height along the main axis lower with respect to a height at the outlet mouth of a duct radially adjacent to the radially more central duct is located.

13. Air filter cartridge of an air intake system of an engine for a vehicle wherein in said air intake system, air is sucked through said filter cartridge so filtered air arrives at an engine of the vehicle, wherein the air filter cartridge has a body extending longitudinally along a main axis having a substantially tubular shape, said cartridge comprising:
   a head element located at one end of the filter cartridge fluidic connecting the cartridge with the air intake system;
   a filter element, comprising a filter wall, filtering the air sucked through the filter element and having extension along the main axis starting from the head element;
   an internal structure extending in length from said head element to inside of the filter element, identifying a plurality of ducts fluidically independent from each other through which the filtered air flows separately;
   wherein each duct extends between an inlet mouth proximate the filter wall and an outlet mouth placed proximate the head element;
   wherein the internal structure induces intake of air through each duct through the filter wall identifying for each duct a respective portion of the filter element faced to the inlet mouth to suck the air through the respective filter element portion through the respective duct;
   wherein the internal structure has a substantially axisymmetric shape with respect to the main axis;
   wherein the inlet mouths, respectively of each duct, are positioned side by side axially along the main axis, each inlet mouth extends concentrically with respect to the main axis;
   each duct comprises a linear section extending parallel to an axis of the extension concentric to an adjacent duct forming an annular tubular section for at least one of said ducts; and
   wherein the filter element comprises a tip at an end opposite head element of hemispherical shape, and the internal structure comprises a tip element internally supporting the tip to support the tip integrally.

14. A method of sucking filtered air for an air intake system of an engine for a vehicle through an air filter cartridge of an air intake system of an engine for a vehicle wherein in said air intake system, air is sucked through said filter cartridge so filtered air arrives at an engine of the vehicle, wherein the air filter cartridge has a body extending longitudinally along a main axis having a substantially tubular shape, said cartridge comprising:
   a head element located at one end of the filter cartridge fluidic connecting the cartridge with the air intake system;
   a filter element, comprising a filter wall, filtering the air sucked through the filter element and having extension along the main axis starting from the head element;
   an internal structure extending in length from said head element to inside of the filter element, identifying a plurality of ducts fluidically independent from each other through which the filtered air flows separately;
   wherein each duct extends between an inlet mouth proximate the filter wall and an outlet mouth placed proximate the head element;
   wherein the internal structure induces intake of air through each duct through the filter wall identifying for each duct a respective portion of the filter element faced to the inlet mouth to suck the air through the respective filter element portion through the respective duct;
   wherein the internal structure has a substantially axisymmetric shape with respect to the main axis;
   wherein the inlet mouths, respectively of each duct, are positioned side by side axially along the main axis, each inlet mouth extends concentrically with respect to the main axis; and each duct comprises a linear section extending parallel to an axis of the extension concentric to an adjacent duct forming an annular tubular section for at least one of said ducts; the method comprising the step of:

sucking the air through the respective filter element portion through the respective duct.

* * * * *